(12) United States Patent
Moosavi et al.

(10) Patent No.: US 12,262,219 B2
(45) Date of Patent: Mar. 25, 2025

(54) PREDICTING CONDITIONS ON CARRIER FREQUENCIES IN A COMMUNICATIONS NETWORK

(71) Applicant: Telefonaktiebolaget LM Ericsson (publ), Stockholm (SE)

(72) Inventors: Reza Moosavi, Linköping (SE); Henrik Rydén, Stockholm (SE); Joel Berglund, Linköping (SE); Pradeepa Ramachandra, Linköping (SE); Roman Zhohov, Linköping (SE); Sakib Bin Redhwan, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 467 days.

(21) Appl. No.: 17/640,988

(22) PCT Filed: Sep. 19, 2019

(86) PCT No.: PCT/SE2019/050893
§ 371 (c)(1),
(2) Date: Mar. 7, 2022

(87) PCT Pub. No.: WO2021/054877
PCT Pub. Date: Mar. 25, 2021

(65) Prior Publication Data
US 2022/0295295 A1   Sep. 15, 2022

(51) Int. Cl.
*H04W 16/22* (2009.01)
*H04W 24/08* (2009.01)
(Continued)

(52) U.S. Cl.
CPC .......... *H04W 16/22* (2013.01); *H04W 24/08* (2013.01); *H04W 76/10* (2018.02); *H04W 36/00692* (2023.05)

(58) Field of Classification Search
None
See application file for complete search history.

(56) References Cited

U.S. PATENT DOCUMENTS

| 2010/0087152 | A1 | 4/2010 | Mourad | |
| 2019/0306739 | A1* | 10/2019 | Kim | H04L 5/0057 |
| 2020/0106536 | A1* | 4/2020 | Bedekar | H04W 48/20 |

FOREIGN PATENT DOCUMENTS

| EP | 3048752 A1 | 7/2016 |
| EP | 3329716 B1 | 6/2020 |

(Continued)

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 15)", 3GPP TS36.331 V15.6.0, Jun. 2019, pp. 1-960.

(Continued)

*Primary Examiner* — Hong Shao
(74) *Attorney, Agent, or Firm* — Weisberg I.P. Law, P.A.

(57) ABSTRACT

Methods and apparatus in a communications network as described herein are suitable for determining a first model for use in predicting conditions on carrier frequencies in the communications network. In a method, network measurements are obtained (302) of conditions on a plurality of carrier frequencies. A first model is then determined (304) based on the obtained measurements that takes as input the conditions on a first subset of the plurality of carrier frequencies and outputs a prediction of the conditions on a second subset of the plurality of carrier frequencies, based on the conditions of the first subset of carrier frequencies.

18 Claims, 7 Drawing Sheets

(51) Int. Cl.
*H04W 76/10* (2018.01)
*H04W 36/00* (2009.01)

(56) References Cited

FOREIGN PATENT DOCUMENTS

| WO | 2017082799 | A1 | 5/2017 |
|----|------------|----|--------|
| WO | 2017091115 | A1 | 6/2017 |
| WO | 2017162262 | A1 | 9/2017 |
| WO | 2019068628 | A1 | 4/2019 |

OTHER PUBLICATIONS

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.6.0, Jun. 2019, pp. 1-365.

Bojovic B., et al., "Machine learning-based dynamic frequency and bandwidth allocation in self organized LTE dense small cell deployments", EURASIP Journal on Wireless Communications and Networking, 2016, pp. 2-16.

Sonnert, A., "Predicting inter-frequency measurements in an LTE network using supervised machine learning—a comparative study of learning algorithms and data processing techniques", Linkoping University, Department of Computer and Information Science, 2018, pp. 1-72.

Rydén H. et al., "Predicting Strongest Cell on Secondary Carrier using Primary Carrier Data", IEEE Wireless Communications and Networking Conference Workshops: 7th International Workshop on Self-Organizing Networks, 2018, pp. 137-142.

Parera, et al., Transfer Learning for Channel Quality Prediction, IEEE Instrumentation and Measurement Society, 1 2019.

\* cited by examiner

PREDICTING CONDITIONS ON CARRIER FREQUENCIES IN A COMMUNICATIONS NETWORK

TECHNICAL FIELD

This disclosure relates to methods, nodes and systems in a communications network. More particularly but non-exclusively, the disclosure relates to predicting conditions on carrier frequencies in a communications network.

BACKGROUND

In a wireless access network such as, for example, a Long Term Evolution (LTE) network, a user equipment (UE) can be connected to one or more radio nodes, and supported by one or more core network nodes. Furthermore, the UE may be served via one or more frequency carriers, and one or more radio access technologies, as will be explained further below. A simplified architecture of an example LTE communications network is shown in FIG. 1, including radio access nodes (e.g. evolved Node Bs which may be referred to as eNode Bs or eNB) 102 and evolved packet core nodes (e.g. a mobile management entity, MME or Serving Gateway, S-GW) 104.

In order to increase capacity in a communications network the operator may deploy cells on multiple frequency layers, referred to as carriers, as illustrated in FIG. 2. Load balancing is a technique to balance the traffic load between overlaid cells 204 in the network in order to utilize the capacity on the different frequency layers. Potential opportunities for load balancing (e.g. transfer of load between cells) are illustrated with arrows in FIG. 2.

Each eNode B assesses the traffic load in its cells. The traffic load information is exchanged between the cells, after which a load balancing algorithm identifies whether there is a need to move users between the cells in order to balance the traffic load. If there is a need to move users in order to balance the traffic load, users are selected and ordered to perform inter-frequency measurements in order to be moved in some way (handover, release with redirect, etc.).

A UE may be configured to transmit and/or receive data via more than one frequency layer/carrier from the same radio node. This is known as carrier aggregation (CA). Furthermore a UE may be configured to transmit/or receive data across two or more different nodes, which is known as dual connectivity (DC). DC enables the establishment of user plane connections via another radio node, referred to as a secondary eNB (SeNB), while maintaining the higher layer connection management (e.g. radio resource management, RRC) via a master eNB (MeNB).

To enable fast CA or DC setup in LTE, early measurement based setup was introduced in 3GPP TS 36.331 (Version 15.6) in Section 6.3.5. In this procedure, a UE that is to be transited from connected mode to idle mode is instructed to perform measurements on certain frequencies so that upon coming back to connected mode, those can be reported to the network and CA/DC can be setup quickly.

In more detail, a UE in idle mode can be instructed to perform radio resource management (RRM) measurements for certain target carriers using information element (IE) MeasIdleConfig from Rel-15 onwards. In LTE, this IE is broadcasted via System Information block Type 5 (SIB5). It is also possible to send this IE dedicatedly to the UE using a RRC connection release message. In this case, the UE is also provided with a timer that indicates the validity duration of this dedicated signaling.

Generally, the IE MeasIdleConfig is used to convey information to the UE about measurements requested to be done while in RRC_IDLE. It has the following format:

```
-- ASN1START
MeasIdleConfigSIB-r15 ::=
    measIdleCarrierListEUTRA-r15        EUTRA-CarrierList-r15,
    ...
}
MeasIdleConfigDedicated-r15 ::= SEQUENCE {
    measIdleCarrierListEUTRA-r15        EUTRA-CarrierList-r15           OPTIONAL,   -- Need OR
    measIdleDuration-r15                ENUMERATED {sec10, sec30, sec60, sec120,
                                            sec180, sec240, sec300, spare},
    ...
}
EUTRA-CarrierList-r15 ::=               SEQUENCE (SIZE (1..maxFreqIdle-r15)) OF MeasIdleCarrierEUTRA-r15
MeasIdleCarrierEUTRA-r15::=             SEQUENCE {
    carrierFreq-r15                         ARFCN-ValueEUTRA-r9,
    allowedMeasBandwidth-r15                AllowedMeasBandwidth,
    validityArea-r15                        CellList-r15
    measCellList-r15                        CellList-r15                OPTIONAL,   -- Need OR
    reportQuantities                        ENUMERATED {rsrp, rsrq, both},          OPTIONAL,   -- Need OR
    qualityThreshold-r15                    SEQUENCE {
        idleRSRP-Threshold-r15                  RSRP-Range              OPTIONAL,   -- Need OR
        idleRSRQ-Threshold-r15                  RSRQ-Range-r13          OPTIONAL    -- Need OR
    }                                                                   OPTIONAL,   -- Need OP
    ...
}
CellList-r15 ::=                        SEQUENCE (SIZE (1.. maxCellMeasIdle-r15)) OF PhysCellIdRange
-- ASN1STOP
```

It is an object of embodiments herein to improve upon this early measurement based setup so as to facilitate, for example, improved load balancing procedures.

SUMMARY

Over time, both the number of subscribers and the performance requirements put on communication networks are increasing. Networks are further required to increase coordination over time. Load balancing is used to move users from over-crowded cells to underutilised cells, to ensure that network capacity is used as optimally as possible.

One issue in load balancing is to choose users to move from one cell (the source cell) that is highly loaded to another cell (the target cell) that is under-utilized. Each unqualified load balancing inter-frequency measurement is a waste of resources such as signaling, processing, UE battery consumption and user performance. The disadvantage is two-fold: many users will spend measurement resources unnecessarily and the cell will stay in a high-load situation longer.

Aggregation features such as CA and DC as described above also share the need to understand radio conditions on other carriers for an individual user. One challenge with these features is to find and assign appropriate secondary cells. Choosing an unsuitable cell may not provide aggregation gains while still having the cost of initiating aggregation in terms of signaling, processing, memory, UE battery consumption etc.

It is thus beneficial to understand the conditions on as many carrier frequencies as possible before making CA, DC or other load balancing decisions.

The number of carriers are increasing with the introduction of new radio (NR); in particular due to the introduction of mmWave frequencies. Currently, as part of the early measurement configuration in LTE it is only feasible to configure at most 8 target carriers for measurement reporting in idle mode and it is likely that the same number will be used in NR as well. As such, assuming that there are N carrier frequencies available for a network operator, denoted by $f_1, f_2, \ldots, f_N$, the network operator would ideally know the radio conditions on all available N carrier frequencies before making a load balancing decision, however it can only instruct the UE to measure and report on, at most, 8 carriers in idle mode.

Furthermore, given that performing such target carrier measurements requires in most cases the users to reconfigure their receive chains to a different frequency carrier from that in the source cell which entails battery consumption and possibly data interruption, it is beneficial to find a way to configure the UE with the optimum configuration for target carrier measurements.

Thus, according to a first aspect herein there is a method in a communications network for determining a first model for use in predicting conditions on carrier frequencies in the communications network. The method comprises obtaining measurements of conditions on a plurality of carrier frequencies, and determining a first model based on the obtained measurements that takes as input the conditions on a first subset of the plurality of carrier frequencies and outputs a prediction of the conditions on a second subset of the plurality of carrier frequencies, based on the conditions of the first subset of carrier frequencies.

According to a second aspect, there is a method in a communications network for determining conditions on carrier frequencies in the communications network, the method comprises determining a first subset of a plurality of carrier frequencies, the first subset of carrier frequencies being for use in predicting conditions on a second subset of the plurality of carrier frequencies, providing conditions on the first subset of the plurality of carrier frequencies to a first model, and receiving from the first model a prediction of the conditions on the second subset of the plurality of carrier frequencies.

As noted above, currently, as part of the early measurement configuration in LTE it is only feasible to configure at most 8 target carriers for measurement reporting in idle mode. Some embodiments herein therefore enable the network, or UE to determine network conditions on many (e.g. potentially all available) secondary target carriers, based on the 8 target carriers that the UE is able to perform measurement reporting on in idle mode. In this way, using the idle mode measurement report when the UE re-connects to the system, the network can predict the coverage on each carrier and perform improved load balancing and admission control without the need for the UE to individually request conditions on each carrier frequency. This reduces signaling overhead and facilitates a reduced number of inter-frequency measurements per user equipment.

According to a third aspect, there is a node in a communications network comprising a processor and a memory. The memory contains instructions executable by the processor and the set of instructions, when executed by the processor, cause the processor to: obtain measurements of conditions on a plurality of carrier frequencies, and determine a first model based on the obtained measurements that takes as input the conditions on a first subset of the plurality of carrier frequencies and outputs a prediction of the conditions on a second subset of the plurality of carrier frequencies, based on the conditions of the first subset of carrier frequencies.

According to a fourth aspect there is a node in a communications network comprising a processor and a memory. The memory contains instructions executable by the processor and the set of instructions, when executed by the processor, cause the processor to: determine a first subset of a plurality of carrier frequencies, the first subset of carrier frequencies being for use in predicting conditions on a second subset of the plurality of carrier frequencies, provide conditions on the first subset of the plurality of carrier frequencies to a first model, and receive from the first model a prediction of the conditions on the second subset of the plurality of carrier frequencies.

According to a fifth aspect there is a user equipment comprising a processor and a memory, said memory containing instructions executable by said processor. The memory contains instructions executable by the processor and the set of instructions, when executed by the processor, cause the processor to: obtain measurements of conditions on a plurality of carrier frequencies, and determine a first model based on the obtained measurements that takes as input the conditions on a first subset of the plurality of carrier frequencies and outputs a prediction of the conditions on a second subset of the plurality of carrier frequencies, based on the conditions of the first subset of carrier frequencies.

According to a sixth aspect there is a user equipment comprising a processor and a memory. The memory contains instructions executable by the processor and the set of instructions, when executed by the processor, cause the processor to: determine a first subset of a plurality of carrier frequencies, the first subset of carrier frequencies being for use in predicting conditions on a second subset of the plurality of carrier frequencies; provide conditions on the first subset of the plurality of carrier frequencies to a first model, and receive from the first model a prediction of the conditions on the second subset of the plurality of carrier frequencies.

According to a seventh aspect there is a computer program product comprising a computer readable medium, the computer readable medium having computer readable code embodied therein, the computer readable code being configured such that, on execution by a suitable computer or processor, the computer or processor is caused to perform the method of the first or second aspects.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

As noted above, the number of carriers are increasing with the introduction of Fifth Generation New Radio (5G NR); in particular due to the introduction of mmWave frequencies. Currently, as part of the early measurement configuration in LTE it is only feasible to configure at most 8 target carriers for measurement reporting by a UE in idle mode and it is possible that the same number (or another fixed number) will be used in NR as well. When performing load balancing decisions and deciding whether to move a subscriber to another carrier frequency, assuming that there are N carrier frequencies available for a network operator, denoted by $f_1, f_2, \ldots, f_N$, the network operator would ideally know the radio conditions on all available N carrier frequencies before making a load balancing decision, however it can only instruct the UE to measure and report on, at most, 8 carriers in idle mode. It is an object of embodiments herein to address this issue.

To this end, embodiments here describe methods and apparatus for i) determining one or more models with which to map or predict the quality on one or more frequencies to the quality of one or more (other) frequencies, ii) determine one or more models for determining a suitable measurement configuration for the target carriers, including, for example, the number of measurements, the frequency and in case of dedicated measurement configuration the validity duration of the configuration, and iii) estimate the radio conditions on all available carriers using the measurement reports received on the subset of carriers determined in the first step.

With respect to point i) some embodiments herein describe determining a predictive model (or function) that may take received measurement reports, e.g., UE measurements on carrier frequencies $\{f_x, f_y, f_z\}$, as input and output a prediction of radio conditions on all N available carrier frequencies.

Figure 1:
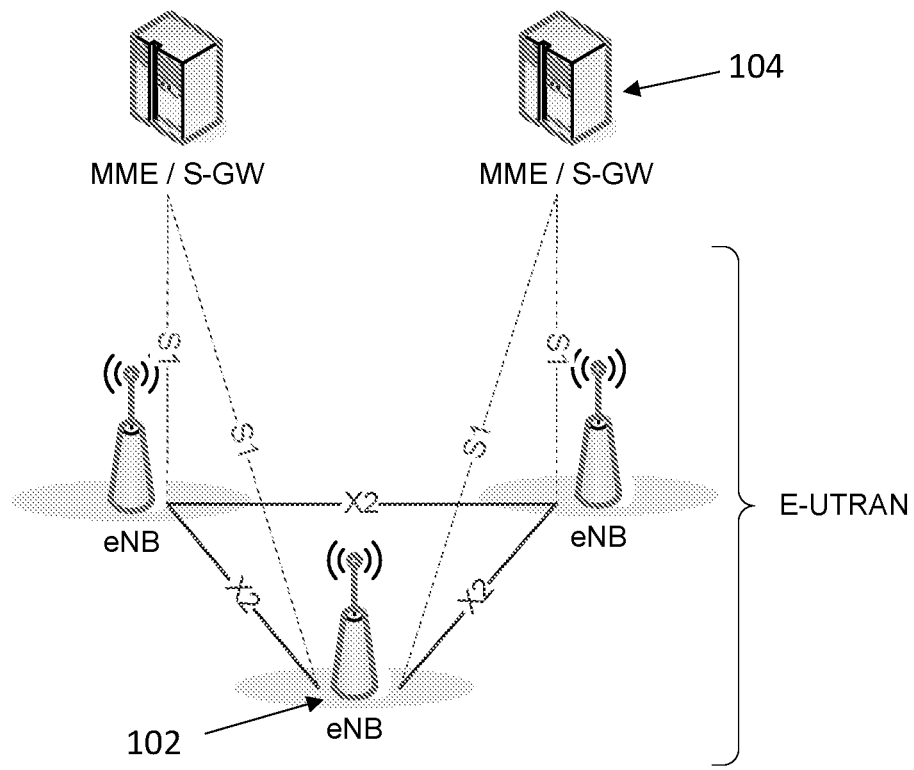
FIG. 1 illustrates a prior art configuration of a Long Term Evolution (LTE) network.
Figure 2:
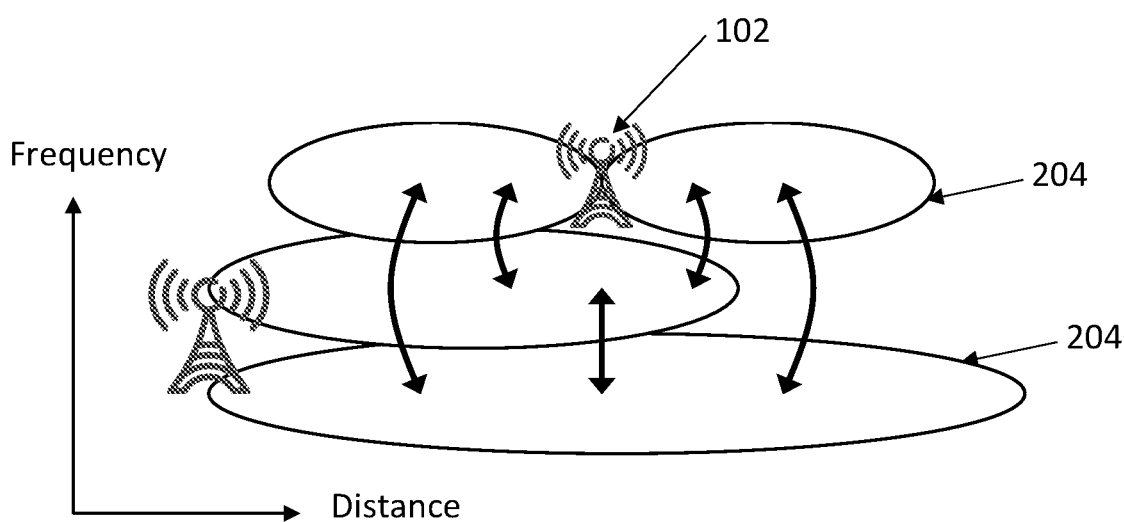
FIG. 2 illustrates a prior art arrangement of overlapping carrier frequencies.
Figure 3:
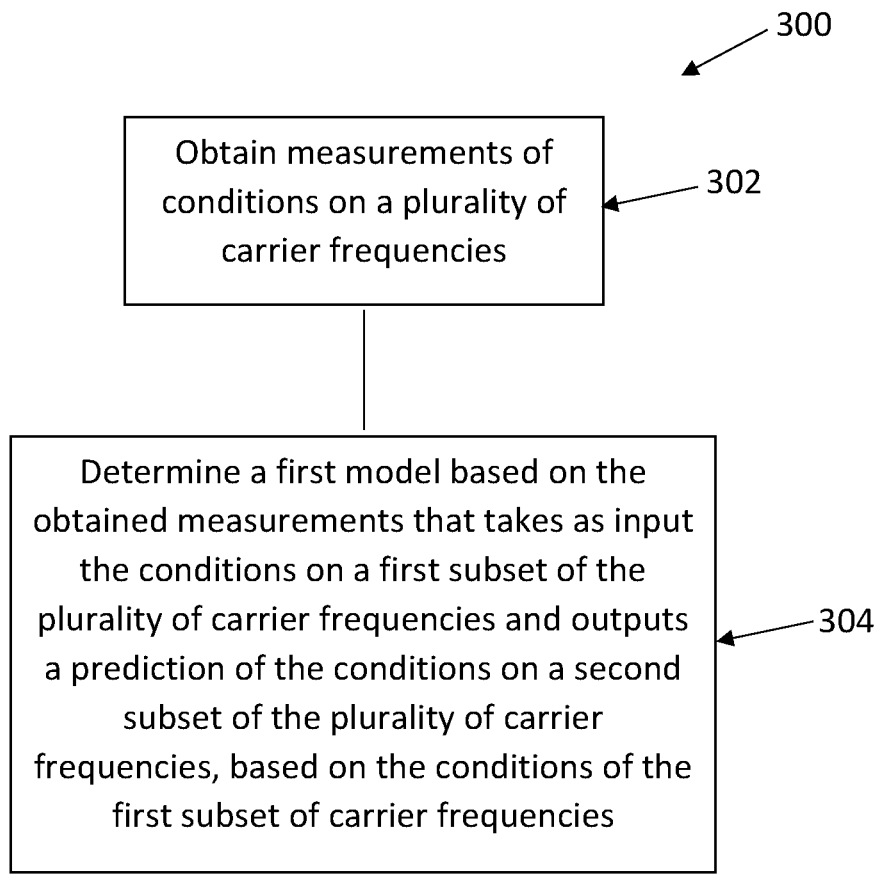
FIG. 3 shows a method according to some embodiments herein.

This is shown in FIG. 3 which illustrates a method 300 in a communications network for determining a first model for use in predicting conditions on carrier frequencies in the communications network. In brief, the method 300 comprises in a first block 302 obtaining measurements of conditions on a plurality of carrier frequencies. In a second block 304 the method comprises determining a first model based on the obtained measurements that takes as input the conditions on a first subset of the plurality of carrier frequencies and outputs a prediction of the conditions on a second subset of the plurality of carrier frequencies, based on the conditions of the first subset of carrier frequencies.

Generally, the communications network (or telecommunications network) may comprise any one, or any combination of: a wired link (e.g. ASDL) or a wireless link such as Global System for Mobile Communications (GSM), Wideband Code Division Multiple Access (WCDMA), Long Term Evolution (LTE), WiFi, or Bluetooth wireless technologies. The skilled person will appreciate that these are merely examples and that the communications network may comprise other types of links.

In some embodiments, the method 300 may be performed, for example, by a network node in a communications network such as the network node 600 described below. The network node may comprise any component or network function (e.g. any hardware or software module) in the communications network suitable for making load balancing decisions, for example, in Carrier Aggregation or Dual Connectivity. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC), such as Access and Mobility Management function (AMF), Session Management function (SMF) and Network Slice Selection Function (NSSF).

In other embodiments the method 300 may be performed by a user equipment, UE (e.g. a device or terminal) such as the UE 700 as described below. Examples of UEs include, but are not limited to, mobile phones, desktop computers, laptop computers, tablet computers and wearable technology such as fitness trackers or iwatches.

In block 302 of obtaining measurements of conditions on a plurality of carrier frequencies, the method may comprise obtaining one or more measurements based on downlink signals on a set of carriers. For example, these may be based on, for example, associated measurement reports, uplink signals and/or dedicated measurements. In some embodiments, obtaining one or more measurements may comprise obtaining UE specific information such as geographical position. The measurements of conditions may indicate the radio quality on a carrier and may be suitable for use in making a load-balancing decision, or for selecting carriers for use in Carrier Aggregation and/or Dual Connectivity. Specific examples of the types of measurements that may be obtained include, but are not limited to one or more of, Reference Signal Received Power (RSRP), Reference Signal Received Quality (RSRQ) or a Signal to Interference and Noise Ratio (SINR). It will be appreciated however that these are only examples and that other measures of the conditions on the plurality of carrier frequencies may also be used.

In some embodiments, a UE may be set to obtain such measurements whilst in idle mode. For example, a network node may set the UE's idle mode measurement configuration to make measurements that can be used to build or train the first model. For example, a plurality of UEs may make measurements on a plurality of carriers (including the first subset of carriers and the second subset of carriers), or the carriers where no accurate model is built. For example, the network can have built an accurate model using f1, f2 for predicting f3. But not from f1, f2 for predicting f4, in this case the UE is configured to measure on frequency f1, f2, f4 in idle mode. This will thus enable the network to predict the third frequency, and build a model between f1, f2 to f4.

Turning to block 304, in some embodiments, determining a first model comprises determining a mapping function between carriers that can be used to map the conditions on one or more carriers to conditions on one or more other carriers.

For example, determining a first model may comprise training a machine learning model to predict the conditions on the second subset of the plurality of carrier frequencies based on the conditions on the first subset of the plurality of carrier frequencies using the obtained measurements as training data.

The skilled person will be familiar with machine learning and machine learning models that can be used to predict conditions on a second subset of carrier frequencies based on a first set of carrier frequencies. Examples of appropriate machine learning models include, but are not limited to: decision trees or neural networks.

The skilled person will be familiar with neural networks, but in brief, neural networks are a type of supervised machine learning model that can be trained to predict a desired output for given input data. Neural networks are trained by providing training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights associated with the neurons are adjusted until the optimal weightings are found that produce predictions for the training examples that reflect the corresponding ground truths. In examples herein the training data may comprise the conditions on the first subset of the plurality of carrier frequencies and the ground truths may comprise actual conditions on the second subset of the plurality of carrier frequencies. In this way the ground truths are example (correct) outputs for the example inputs.

The skilled person will further be familiar with decision tree machine learning models. Decision trees, also known as classification trees or regression trees, are supervised learning methods used to create a model that predicts the value of a target variable by learning simple decision rules inferred from the data features. To predict a response, a leaf node is to be reached from the root node by following a sequence of criteria.

These are just two examples of the types of machine learning models that may be used to create the models described herein, but it will be appreciated that any model that can be trained, using the training data as described above, to take as input the conditions on a first subset of the plurality of carrier frequencies and output a prediction of the conditions on a second subset of the plurality of carrier frequencies could equally be used.

The first model may comprise a plurality of sub-models, for example, the number of which may depend on the number of carrier frequencies, the accuracy requirements, and the correlation between frequencies. For example, in an embodiment where there are three carrier frequencies, a model could be built from f1,f2→f3, the UE would in this case perform idle mode measurements on f1,f2. The UE could also measure only on f1, and predict f2, f3 from f1. The uncertainty will be higher in this scenario since both f2 and f3 are estimated. However, the network can set the idle mode measurement configuration to trade-off between the required prediction accuracy of the three frequencies (f1,f2, f3), and the UE measurement overhead.

More generally, if N frequencies are available (f1, ..., fN), and the UE is capable of measuring M frequencies, if M<N the sub-models that can be built are:

Each combinations of M carriers to predict remaining N-M carriers.

If M>N the models that can be built are:

Each combination of N−1 carriers to predict 1 remaining carrier;

Each combination of N−2 carriers to predict 2 carriers;

Each combination of N−3 carriers to predict 3 carriers;

Etc.

Furthermore, the network may configure the UE with m frequencies where m<M, in which case the network can configure different combinations for m to predict different combinations/number of carriers, and evaluate the accuracy:

Each combinations of (M−1) carriers to predict remaining (N−M+1) carriers

Each combinations of (M−2) carriers to predict remaining (N−M+2) carriers etc.

The output prediction of conditions on the second subset of the plurality of carrier frequencies may comprise, for example, an indication of a signal quality on a carrier such as SINR, RSRP or RSRQ; an accuracy metric, e.g. such as a root mean squared error; a probability of signal quality above a threshold on a carrier; or an accuracy metric such as a measure of logarithmic loss (Logloss). The skilled person will be familiar with Logloss which may be used to measure the performance of a classification model.

Put another way, in some embodiments where the plurality of carrier frequencies comprises N carrier frequencies and the first subset of the carrier frequencies comprises M carrier frequencies, the method may comprise training the first model to predict conditions on the remaining N-M carrier frequencies. In some embodiments, the method may further comprise training the first model to predict conditions on the remaining N-M carrier frequencies for each possible combination of M carrier frequencies. The method may further comprise training the first model to predict conditions on the remaining N-M carrier frequencies for each possible value of M.

In this way, a model may be used to predict conditions on any carrier frequency from conditions on any other carrier frequency, or combination of carrier frequencies. In particular, where there is a maximum number of frequencies that a UE can report on in idle mode, the number of carrier frequencies in the first subset of the plurality of carrier frequencies may comprise the maximum number of frequencies on which measurements may be reported in idle mode by a user equipment. As such, this enables the conditions on any number of other carrier frequencies to be predicted, based on this fixed number of carrier measurements.

Put more generally, the second subset of the plurality of carrier frequencies may comprise frequencies available to the UE for a load balancing, CA or DC orchestration operation. The first model may then be used to predict, from measurements made on the maximum number of frequencies (e.g. 8 frequencies) on which measurements may be reported in idle mode by a user equipment, the conditions on the frequencies available to the UE for the load balancing, CA or DC orchestration operation.

Alternatively, the second subset of the plurality of carrier frequencies may comprise all carrier frequencies available to the user equipment. As such, the first model may be used to predict, from measurements made on the maximum number of frequencies (e.g. 8 frequencies) on which measurements may be reported in idle mode by a user equipment, the conditions on all of the other carrier frequencies available to the user equipment.

The training may be performed completely by a network node, for example, the network node may determine or train the first model based on training data as described above.

In other embodiments, the method may be performed in a distributed manner such that some training is performed by a plurality of individual UEs. The training may be coordinated and combined into a single model by a network node. For example, in embodiments where the method is performed by a node in the communications network, the method may further comprise: sending details of the first model to a user equipment such that the user equipment may create a local version of the first model on the user equipment and train the local model, based on measurements of conditions on the plurality of carrier frequencies as measured by the user equipment. The network node may subsequently receive from the user equipment an indication of an outcome of the training of the local model performed by the user equipment and update the first model based on the received outcome. In this way the training of the first model may be distributed facilitating training based on a much wider training data set and conditions.

From the point of view of a UE, therefore, the UE may receive an indication of a type of model and/or parameters for said model from a network node in order for the UE to establish a local copy of the first model. The UE may train the local copy of the first model on data acquired by the UE, and send trained/updated parameters to the network node.

In this way, the Network Node can collect feedback from different UEs to further enhance its prediction models. The feedback can be transmitted in the form of trained models that can be used to improve the centralized first model or verify prediction accuracy. From the UE perspective the UE may reply with a trained Machine learning model. This approach allows the incorporation of many simple models from UEs to boost prediction performance, moreover, it is possible to include sensitive information such as radio and/or geographical position as an input to the model, that may not be available to the network node.

Generally, in embodiments where the training is distributed across a plurality of UEs, the UE may:
 Receive an ML model from the network (it can be pre-trained based on the previous measurements);
 Perform measurements on given frequencies (f1, f2 . . . , fN) and apply it on ML model;
 Send a trained model to the network;
 The network may reply with the model output (frequency(-ies), e.g. (fO1, fO2 . . . ));
 Perform measurements on the new frequency(-ies);
 Save measurements for cell(s) qualified for IDLE mode reporting and find a suitable cell to camp normally.

Turning back more generally to the method 300, in some embodiments the method further comprises determining the accuracy of the predicted conditions on each of the second subset of the plurality of carrier frequencies. E.g. determining the accuracy of the output of the first model. The accuracy may, for example, be determined based on the number of times the model accurately (e.g. within a tolerance) predicts the conditions on a carrier frequency, compared to the total number of samples.

The method may further comprise determining a validity period for the predicted conditions on each of the second subset of the plurality of carrier frequencies. The validity period may comprise a timer that indicates how long the UE may use this configuration. In this way, when a prediction is made by the first model the accuracy and duration for which the prediction applies may be provided to the UE, such that the most appropriate load balancing decisions may be made.

In principle, the first model, as described above, can enable conditions on any carrier frequency to be determined (or estimated) from any combination of other carrier frequency measurements. However, some combinations of input parameters (e.g. using certain combinations of the plurality of carrier frequencies as the first subset of the plurality of carrier frequencies) may produce more accurate outputs than other combinations.

Figure 4:
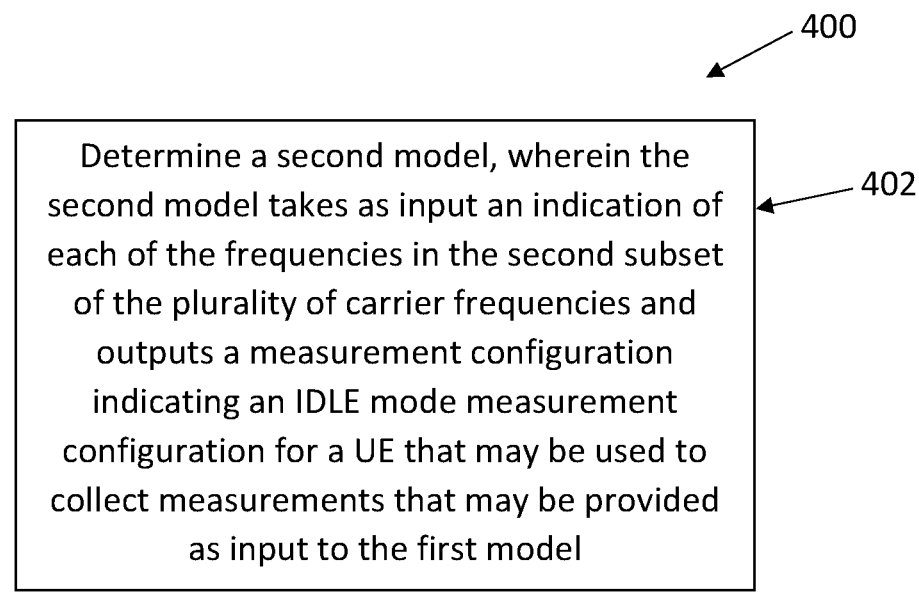
FIG. 4 shows another method according to some embodiments herein.

Therefore, as noted above, there is also, (separately, or additionally to the method 300) a method 400 of determining a measurement configuration for target carriers. This method is illustrated in FIG. 4. Put another way, there is a method of determining which frequencies should be comprised in the first subset of the plurality of carrier frequencies in order to best predict the conditions on the second subset of carrier frequencies. The purpose of such a method, may be, for example, to determine a suitable measurement configuration that enables radio conditions to be estimated on all carrier frequencies (e.g. all carrier frequencies available to a UE), based on the restricted number of carrier frequencies on which the UE can measure (e.g. the maximum eight), using the first model as described above. Alternatively, the purpose of such a method may be, for example, to determine a suitable measurement configuration that enables radio conditions to be estimated on carrier frequencies available to the UE for a load balancing, CA or DC orchestration operation to be determined, based on measurements on the restricted number of carrier frequencies on which the UE can measure (e.g. the maximum eight), using the first model as described above.

In embodiments herein, a measurement configuration may comprise, for example, an indication of the number of measurements that should be made by a UE, the carrier frequencies on which the measurements should be made, and in embodiments of dedicated measurement configuration, an indication how long the measurement configuration is estimated to be valid for (e.g. a validity duration). Generally a measurement configuration may comprise an IDLE model measurement configuration for a UE, describing measurements to be made by a UE as part of an early measurement based setup procedure (as described in Rel-15).

In some embodiments, a machine learning model may be used to determine the measurement configuration. For example, the method 400 may comprise in a block 402 (or the method 300 may further comprise) determining a second model wherein the second model takes as input an indication of each of the frequencies in the second subset of the plurality of carrier frequencies and outputs a measurement configuration indicating an IDLE mode measurement configuration for a UE that may be used to collect measurements that may be provided as input to the first model.

The second model may take as input a list of carrier frequencies. The list of carrier frequencies may comprise an indication of one or more carrier frequencies for which it is desired to know the conditions on. For example, a list of carrier frequencies for which it is desired to know the conditions on, for example, so that a load balancing, CA or DC orchestration decision may be made. For example, the list of carrier frequencies may comprise an indication of each of the frequencies in the second subset of the plurality of carrier frequencies. The second model may output a measurement configuration indicating an IDLE mode measurement configuration for a UE that may be used to collect measurements that may be provided as input to the first model such that the first model may predict the conditions on the carrier frequencies in the list of carrier frequencies (e.g. the second subset of the plurality of carrier frequencies) in an optimal manner.

In embodiments where the communications network comprises a E-UTRAN network, the second model may output a measurement configuration comprising a configuration for a MeasIdleConfig information element (IE) as described above, such as, for example, MeasIdleConfigSIB-r15 and/or MeasIdleConfigDedicated-r15

The second machine learning model may comprise any type of machine learning model can be trained to take as input a list of carrier frequencies as described above and output a measurement configuration indicating an IDLE mode measurement configuration for a UE that may be used by the UE to collect measurements that may be provided as input to the first model such that the first model may predict the conditions on the carrier frequencies in the list of carrier frequencies. Examples of machine learning models suitable for such a purpose were described above with respect to the first machine learning model and the details therein apply equally to the second machine learning model.

In some embodiments, the output IDLE mode configuration may be used to collect measurements that may be input to the first model and used by the first model in order to determine conditions on all available carrier frequencies available to the UE. In some embodiments, the output IDLE mode configuration may be used to collect measurements that may be input to the first model and used by the first model in order to determine conditions on carrier frequencies available to the UE for use in a load balancing, CA or DC operation.

The second model may further take other parameters, such as an accuracy requirement for a prediction made by the first model. An accuracy requirement may indicate, for example, that all predictions should be above a threshold accuracy; that estimations of conditions of particular frequencies should be above a threshold accuracy, or within a threshold range. An accuracy requirement may also indicate particular carrier frequencies where a high level of accuracy is not required. Such accuracy requirements may have a technical effect on the determined configuration and enable predictions to be made more optimally, for example, by achieving a desired accuracy of prediction based on the fewest number of input carrier frequency measurements. For example, in an example embodiment, if the second subset of carrier frequencies comprises 20 frequencies (e.g. if the first model is to be used to predict conditions on 20 frequencies) and a prediction is required having 90% accuracy, then the UE may need to be configured to make measurements on 8 frequencies; however if only a 50% accuracy level is required, then three carriers may be sufficient to predict the other 20 carriers.

Examples of other input parameters that may be provided to the second model include but are not limited to: load information on one or more of the carrier frequencies, and/or geographical information related to the location of the UE making the measurements. In some embodiments, the second model may be trained using the same training data as that used to train the first machine learning model (e.g. the training data may be re-used). UE specific information such as radio and/or geographical position may additionally be provided. Training data may generally comprise measurements based on downlink signals at a set of carriers and measurement reports, optionally uplink signals and associated measurements. It is also possible to include device specific information such as radio and/or geographical position.

As an example, the output of the second model may comprise one or more frequencies that the UE should report on in IDLE mode, for example, an output may comprise {fx,fy,fz} meaning that three target carrier frequencies fx, fy and fz should be configured for measurement and reporting. In embodiments related to dedicated signalling, the outcome may be of the form $\{f_a, f_b, T\}$, indicating that the carrier frequencies $f_a$ and $f_b$ should be configured for measurement and reporting for a duration of T seconds.

In this way, an appropriate measurement configuration may be determined for a UE in order for the UE to make measurements in IDLE mode that may be provided to the first model for use in predicting conditions on carrier frequencies available to the UE. These measurements and predictions may be used in a load balancing, CA or DC operation, for example. The use of machine learning models allows the measurement configuration to be determined based on much more complex data, including load information and geographic location.

Figure 5:
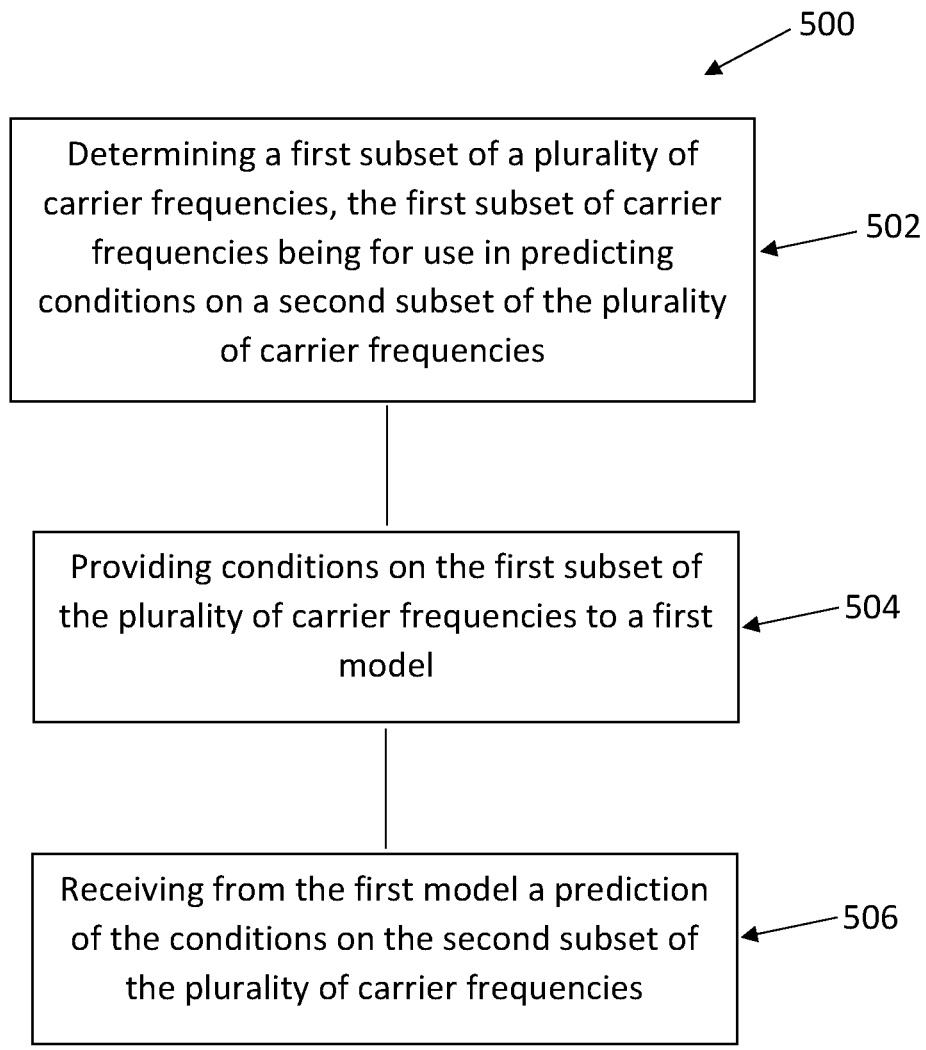
FIG. 5 shows another method according to some embodiments herein.

Turning now to FIG. 5, there is a method 500 in a communications network for determining conditions on carrier frequencies in the communications network. In brief, the method comprises in a first block 502 determining a first subset of a plurality of carrier frequencies, the first subset of carrier frequencies being for use in predicting conditions on a second subset of the plurality of carrier frequencies. In a second block 504, the method comprises providing conditions on the first subset of the plurality of carrier frequencies to a first model. In a block 506, the method then comprises receiving from the first model a prediction of the conditions on the second subset of the plurality of carrier frequencies.

The method 500 may be used, for example, in configuring a UE to make measurements on an appropriate first subset of carrier frequencies, such that conditions on the remaining carrier frequencies available to it may be determined (e.g. estimated or predicted). In this way, from a smaller number of measurements, the conditions on all carrier frequencies available to the UE may be determined and this information may be used to choose appropriate carrier frequencies for performing carrier aggregation and/or dual connectivity processes and/or to make improved load balancing decisions.

Generally, the method 500 may be performed by a node in the communications network such as the node 600 as described below. Examples of nodes were also described above with respect to the method 300 and the details therein will be understood to apply equally to the method 500. The first model was described in detail above with respect to the method 300 and the details therein will be understood to apply equally to the method 500.

Block 502 may comprise determining the first subset of the plurality of carrier frequencies using a machine learning model such as the second machine learning model as described above with respect to the method 300. The details of the second machine learning model described above with respect to the method 300 will be understood to apply equally to the method 500.

In more detail, determining a first subset of the plurality of carrier frequencies may thus comprise providing an indication of the frequencies in the second subset of carrier frequencies to a second machine learning model as input, and receiving from the second machine learning model a measurement configuration indicating an IDLE mode measurement configuration for a UE that may be used to collect measurements that may be provided as input to the first model in order for the first machine learning model to predict the conditions on the second subset of the plurality of carrier frequencies.

The first subset of carrier frequencies may be determined based on an accuracy of the first model at predicting the conditions on the second subset of the plurality of carrier frequencies from the conditions on the first subset of the plurality of carrier frequencies. For example, the accuracy of the first model at predicting the conditions on the second subset of the carrier frequencies from the first subset of carrier frequencies may be provided as an input parameter to the second model.

The first subset of carrier frequencies may be selected such that the accuracy of the first model at predicting the conditions on each carrier frequency in the second subset of the plurality of carrier frequencies is above a threshold accuracy; or to provide the highest accuracy predictions of the conditions on each of the second subset of the plurality of carrier frequencies from the conditions on the first subset of carrier frequencies.

In some embodiments, the carrier frequencies comprised in the second subset of carrier frequencies comprise carrier frequencies on which the resource load is below a threshold (e.g. where the load is considered to be "low").

As noted above, the first subset of carriers may be restricted in number to the maximum number of frequencies on which measurements may be reported in idle mode by a user equipment. This may be eight frequencies, for example.

Generally, the selection of the first subset of carrier frequencies (e.g. the target carrier configuration) can be based on a trade-off between the performance of the first model and the number of frequencies required and the combination of frequencies. The combination of frequencies can be significant as some combinations of frequencies can result in a higher (predictive) performance of the first model than others. The performance of the first model can be expressed in different ways, such as mean absolute error, mean squared error, variance, AUC, etc, depending on if regression or classification is used. The measurement configuration could be chosen such that the performance of the first model is above a certain threshold with as few carriers as possible. Note that the choice of carriers can also impact the configuration duration, T. In some embodiments, configurations are only accepted if they are at least valid for $T_k$ seconds. In another embodiment, if the selection is based on the maximum number of carrier measurements that can be made by a UE (e.g. 8), then the selection of the first subset of carrier frequencies may be based on which carrier frequencies can be used by the first model to provide predictions with the highest accuracy on the remaining carriers.

In block 504, the method may comprise obtaining conditions on the first subset of the plurality of carrier frequencies. For example, the output measurement configuration provided by the second model may be sent to the UE in order for the UE to determine (e.g. measure) conditions on the first subset of the plurality of carrier frequencies. The measurement configuration may be sent to the UE, in a MeasIdleConfig IE, for example.

The obtained conditions may then be provided to the first model. In block 506, the method then comprises receiving from the first model a prediction of the conditions on the second subset of the plurality of carrier frequencies.

In any of the embodiments described above, the method 500 may further comprise making a scheduling decision, based on the output of the first model. For example, the method 500 may further comprise sending the prediction of the conditions on the second subset of the plurality of carrier frequencies from the first model to the user equipment for use by the user equipment to determine a carrier frequency or frequencies to connect to, for example, as part of a CA, DC or other load balancing decision. Thus such operations may be performed based on a better understanding of the conditions on available frequency carriers.

Alternatively, a network node may determine a carrier frequency for the user equipment to connect to, based on the prediction of the conditions on the second subset of the plurality of carrier frequencies from the first model. The network node may send this to the user equipment for the user equipment to initiate a connection to the determined carrier frequency.

Turning now to specific example embodiments, in one embodiment, block 502 may be performed by a network node. The network node may send an indication of the first subset of a plurality of carrier frequencies (e.g. a measurement configuration determined by the second model), and details of the first model to the UE. The UE may then make measurements on the conditions on the first plurality of carrier frequencies as described in the measurement configuration and provide the measurements to a local copy of the first model (e.g. the UE may perform blocks 502 and 504). The measurement configuration and first model can be sent either via broadcasting of system information or via dedicated signaling.

In some embodiments, the method 500 may therefore comprise a UE receiving an indication of one or more parameters from a node in the communications network, and using the one or more parameters to determine the first model, for example, to create a local copy of the model. As an example, in some embodiments, the first model could be sent to a UE using a modified MeasIdleConfig information element with the following format:

```
-- ASN1START
MeasIdleConfigSIB-r15 ::=       = SEQUENCE {
    measIdleCarrierListEUTRA-r15        EUTRA-CarrierList-r15,
    mlModelToCampNormally               ML-ModelToCampNormally                          OPTIONAL,
    -- Need OR
    ...
}
MeasIdleConfigDedicated-r15 ::=  SEQUENCE {
    measIdleCarrierListEUTRA-r15        EUTRA-CarrierList-r15                           OPTIONAL,  -- Need OR
    measIdleDuration-r15                ENUMERATED {sec10, sec30, sec60, sec120,
                                            sec180, sec240, sec300, spare},
    mlModelToCampNormally               ML-ModelToCampNormally                          OPTIONAL,
    -- Need OR
    ...
}
```

```
ML-ModelToCampNormally::       = CHOICE{
    decisionTree                    DecisionTreeParams,
    linearRegression                LinearRegressionParams,
    ...
}
EUTRA-CarrierList-r15 ::       = SEQUENCE (SIZE (1..maxFreqIdle-r15)) OF MeasIdleCarrierEUTRA-r15
MeasIdleCarrierEUTRA-r15::=    SEQUENCE {
    carrierFreq-r15                 ARFCN-ValueEUTRA-r9,
    allowedMeasBandwidth-r15        AllowedMeasBandwidth,
    validityArea-r15                CellList-r15                                    OPTIONAL,  -- Need OR
    measCellList-r15                CellList-r15                                    OPTIONAL,  -- Need OR
    reportQuantities                ENUMERATED {rsrp, rsrq, both},
    qualityThreshold-r15            SEQUENCE {
        idleRSRP-Threshold-r15          RSRP-Range                                  OPTIONAL,  -- Need OR
        idleRSRQ-Threshold-r15          RSRQ-Range-r13                              OPTIONAL   -- Need OR
    }                                                                               OPTIONAL,  -- Need OP
    ...
}
CellList-r15 ::=               SEQUENCE (SIZE (1.. maxCellMeasIdle-r15)) OF PhysCellIdRange
-- ASN1STOP
```

As an alternative, the measurement configuration may be broadcasted by the network node using a (dedicated) system information message, denoted by SystemInformationBlockType-xx of the following format:

SystemInformationBlockType-xx

The IE SystemInformationBlockType-xx contains information relevant for different machine learning model that can be applied by UEs in different scenarios.

```
SystemInformationBlockType-xx ::=   SEQUENCE {
    mlModelToCampNormally           ML-ModelToCampNormally   OPTIONAL,   -- NEED OR
    ...
}
-- ASN1STOP
```

An example of a corresponding MeasidleConfig IE in an embodiment where SystemInformationBlockType-xx is broadcast, is as follows:

MeasIdleConfig information element

```
-- ASN1START
MeasIdleConfigSIB-r15 ::       = SEQUENCE {
    measIdleCarrierListEUTRA-r15    EUTRA-CarrierList-r15,
    ...
}
MeasIdleConfigDedicated-r15 ::=     SEQUENCE {
    measIdleCarrierListEUTRA-r15    EUTRA-CarrierList-r15                           OPTIONAL,  -- Need OR
    measIdleDuration-r15            ENUMERATED {sec10, sec30, sec60, sec120,
                                        sec180, sec240, sec300, spare},
    ...
}
ML-ModelToCampNormally:: = CHOICE{
    decisionTree                    DecisionTreeParams,
    LinearRegression                LinearRegressionParams,
    ...
}
EUTRA-CarrierList-r15 ::       = SEQUENCE (SIZE (1..maxFreqIdle-r15)) OF MeasIdleCarrierEUTRA-r15
MeasIdleCarrierEUTRA-r15::=    SEQUENCE {
    carrierFreq-r15                 ARFCN-ValueEUTRA-r9,
    allowedMeasBandwidth-r15        AllowedMeasBandwidth,
    validityArea-r15                CellList-r15                                    OPTIONAL,  -- Need OR
    measCellList-r15                CellList-r15                                    OPTIONAL,  -- Need OR
    reportQuantities                ENUMERATED {rsrp, rsrq, both},
    qualityThreshold-r15            SEQUENCE {
        idleRSRP-Threshold-r15          RSRP-Range                                  OPTIONAL,  -- Need OR
        idleRSRQ-Threshold-r15          RSRQ-Range-r13                              OPTIONAL   -- Need OR
    }                                                                               OPTIONAL,  -- Need OP
    ...
}
CellList-r15 ::=               SEQUENCE (SIZE (1.. maxCellMeasIdle-r15)) OF PhysCellIdRange
-- ASN1STOP
```

In such embodiments, the UE may perform measurements on given frequencies (f1, f2 . . . , fN) and apply the measurements to the second machine learning model to output an appropriate measurement configuration for the UE. The second machine learning model may output a measurement configuration for the UE comprising the first subset of the plurality of carrier frequencies e.g. (fO1, fO2 . . . ). The UE may then perform measurements on the first subset of the plurality of carrier frequencies and save the measurements for cell(s) qualified for IDLE mode reporting and find a suitable cell to camp normally. The measurements may then be provided as input to the first machine learning model for use in predicting the conditions on the on the second subset of the plurality of carrier frequencies.

In this way, the UE may make measurements of the conditions on the first subset of the plurality of carrier frequencies and provide said measurements to the first model. The UE may then report the conditions on the first subset of the plurality of carrier frequencies and the output of the first model (e.g. the predicted conditions on the second subset of the plurality of carrier frequencies) to the network node. The network node may thus determine whether to move the UE onto a different carrier, based on the reported conditions.

In another embodiment, blocks 502, 504 and 506 are performed by the network node. In embodiments where the method 500 is performed by a network node, the method may further comprise sending an indication of the determined first subset of carrier frequencies to a user equipment, and receiving measurements of conditions on the first subset of carrier frequencies from the user equipment. Providing conditions on the first subset of the plurality of carrier frequencies to a first model may then comprise the network node providing the measurements of conditions on the first subset of carrier frequencies from the user equipment to the first model. Put another way, after block 502, the network node may send a request the UE to make measurements of the conditions on the first subset of the plurality of carrier frequencies. The network node may receive the requested conditions from the UE and proceed to perform blocks 504 and 506 of the method 500. In such an embodiment, the UE is effectively blind to the first and second models and the methods that are proposed; that is, it only serves the network node with measurement reports when requested.

In yet another specific embodiment, the network node may provide the UE with parameters pertaining to both the first model and the second model. As such, in some embodiments, the UE may perform all three blocks 502, 504 and 506 of the method 500, based on local copies of the first and second models.

In embodiments whereby parameters relating to the first and/or second models are sent to the UE, upon receiving the parameters, the UE may save the model information for example in VarMeasIdleConfig. Thus in some embodiments, the VarMeasIdleConfig IE may have the following format:

In such embodiments, if the ML model is transmitted through SIB5 or dedicated signaling the corresponding UE actions may be as below:

5.3.8.3 Reception of the RRCConnectionRelease by the UE
The UE shall:
1> if the RRCConnectionRelease message includes the measIdleConfig:
2> clear VarMeasIdleConfig and VarMeasIdleReport;
2> store the received measIdleDuration in VarMeasIdleReport;
2> start T331 with the value of measIdleDuration;
2> if the measIdleConfig contains measIdleCarrierListEUTRA:
3> store the received measIdleCarrierListEUTRA in VarMeasIdleConfig;
2> else:
3> store the measIdleCarrierListEUTRA received in SIB5 in VarMeasIdleConfig;
2> if the measIdleConfig contains mlModelToCampNormally:
3> store the received mlModelToCampNormally in VarMeasIdleConfig;
2> else:
3> store the mlModelToCampNormally received in SIB5 in VarMeasIdleConfig;
2> start performing idle mode measurements as specified in 5.6.20;

If the ML Model is Transmitted Via New

SystemInformationBlockType-xx as described above, upon receiving the SystemInformationBlockType-xx, the UE actions may be as below:
5.2.2.xx Actions Upon Reception of SystemInformationBlockType-xx
Upon receiving SystemInformationBlockType-xx, the UE shall:
1> if in RRC_IDLE and UE has stored VarMeasIdleConfig and SIB-xx includes the mlModelToCampNormally and the UE is capable of IDLE mode measurements for CA:
2> if T331 is running and VarMeasIdleConfig does not contain mlModelToCampNormally within measIdleConfig:
3> store the contents of mlModelToCampNormally within measIdleConfig;
2> start performing idle mode measurements on supported carriers as specified in 5.6.20;

In some embodiments, Idle mode measurements performed by the UE may be modified as below:
5.6.20 Idle Mode Measurements
5.6.20.1 General
This procedure specifies the measurements done by a UE in RRC_IDLE when it has an IDLE mode measurement

| VarMeasIdleConfig UE variable |
|---|

```
-- ASN1START
VarMeasIdleConfig-r15 ::= SEQUENCE {
    measIdleCarrierListEUTRA-r15      EUTRA-CarrierList-r15                           OPTIONAL
    measIdleDuration-r15              ENUMERATED {sec10, sec30, sec60, sec120,
                                         sec180, sec240, sec300}
    mlModelToCampNormally             ML-ModelToCampNormally
}
-- ASN1STOP
``` configuration and the storage of the available measurements by a UE in both RRC_IDLE and RRC_CONNECTED.

5.6.20.2 Initiation

While T331 is running, the UE shall:
1> perform the measurements in accordance with the following:
  2> for each entry in measIdleCarrierListEUTRA within varMeasIdleConfig:
    3> if UE supports carrier aggregation between serving carrier and the carrier frequency and bandwidth indicated by carrierFreq and allowedMeasBandwidth within the corresponding entry;
      4> If UE is configured with mlModelToCampNormally
        5> perform measurements in the carrier frequency and bandwidth indicated by carrierFreq and allowedMeasBandwidth within the corresponding entry;
        NOTE: How the UE performs measurements in IDLE mode is up to UE implementation as long as the requirements in 36.133 [16] are met for measurement reporting. UE is not required to perform idle measurements if SIB2 idle measurement indication is not configured.
        5> apply the measurement results to the machine learning model and find a new frequency
        5> perform measurements in the new frequency
        5> store measurement results for cells applicable for idle mode measurement reporting within the VarMeasIdleReport;
      4> else:
        5> perform measurements in the carrier frequency and bandwidth indicated by carrierFreq and allowedMeasBandwidth within the corresponding entry;
        NOTE: How the UE performs measurements in IDLE mode is up to UE implementation as long as the requirements in 36.133 [16] are met for measurement reporting. UE is not required to perform idle measurements if SIB2 idle measurement indication is not configured.
        5> if the measCellList is included:
          6> consider PCell and cells identified by each entry within the measCellList to be applicable for idle mode measurement reporting;
        5> else:
          6> consider PCell and up to maxCellMeasIdle strongest identified cells whose RSRP/RSRQ measurement results are above the value(s) provided in quality Threshold (if any) to be applicable for idle mode measurement reporting;
        5> store measurement results for cells applicable for idle mode measurement reporting within the VarMeasIdleReport;
    3> else:
      4> do not consider the carrier frequency to be applicable for idle mode measurement reporting;
1> if validityArea is configured in VarMeasIdleConfig and UE reselects to a serving cell whose physical cell identity does not match any entry in validityArea for the corresponding carrier frequency:
  2> stop T331;

There are a range of advantages associated with the embodiments above, for example, functionality related to inter-frequency measurement stand to gain since less expensive and more efficient measurements can be used instead. Less expensive refers to all of the following costs: Air interface signaling, Processing in the eNB, UE battery consumption, and/or User performance.

With respect to load balancing, instead of essentially randomly selecting UEs and requesting each of them to perform inter-frequency measurements, suitable UEs may be targeted much more efficiently. This means that with regard to load balancing the following gains are enabled: reduced number of inter-frequency measurements per UE which provides all of the general benefits mentioned above; Load differences may be neutralized faster which means that system resources are utilized more efficiently; multiple target carriers can be evaluated for an individual UE without increasing the number of inter-frequency measurements, which allows the load balancing function to distribute UEs in a more efficient way.

With respect to Carrier Aggregation (CA), Dual Connectivity (DC) and/or Unlicensed Carriers (UCs), this disclosure allows those secondary cells to be setup up faster and with less effort. Furthermore, the network can adapt which frequencies the UE should measure based on the prediction models at the network node, leading to faster model training. The main goal of admission control (AC) is to manage a trade-off between the number of bearers and Quality of Service (QoS) that users experience if admitted. Embodiments herein can assist AC processes by making faster decision based on the users' QoS requirements. Information received from the model regarding the estimated radio conditions on all available carriers in combination with QoS bearers information can improve AC procedure and avoid quality degradation.

Figure 6:
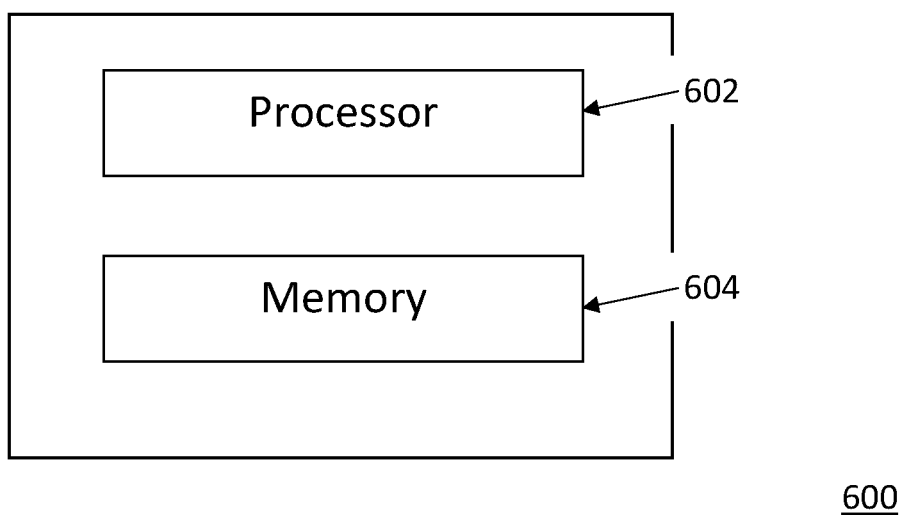
FIG. 6 illustrates a node according to some embodiments herein.

Turning now to other embodiments, as illustrated in FIG. 6, in some embodiments there is a network node 600 in a communications network according to some embodiments herein. The node 600 is configured (e.g. adapted or programmed) to perform any of the embodiments of the method 300 and/or the method 500 as described above.

Generally, the node 600 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 600 may be configured or operative to perform the methods and functions described herein, such as the methods 300, 400 or 500 as described above. The node 600 may comprise processing circuitry (or logic) 602. It will be appreciated that the node 600 may comprise one or more virtual machines running different software and/or processes. The node 600 may therefore comprise one or more servers, switches and/or storage devices and/or may comprise cloud computing infrastructure or infrastructure configured to perform in a distributed manner, that runs the software and/or processes.

The processor 602 may control the operation of the node 600 in the manner described herein. The processor 602 can comprise one or more processors, processing units, multi-core processors or modules that are configured or programmed to control the node 600 in the manner described herein. In particular implementations, the processor 602 can comprise a plurality of software and/or hardware modules that are each configured to perform, or are for performing, individual or multiple steps of the functionality of the node 600 as described herein.

The node 600 may comprise a memory 604. In some embodiments, the memory 604 of the node 600 can be configured to store program code or instructions that can be executed by the processor 602 of the node 600 to perform the functionality described herein. Alternatively or in addition, the memory 604 of the node 600, can be configured to store any requests, resources, information, data, signals, or similar that are described herein. The processor 602 of the node 600 may be configured to control the memory 604 of the node 600 to store any requests, resources, information, data, signals, or similar that are described herein.

It will be appreciated that the node 600 may comprise other components in addition or alternatively to those indicated in FIG. 6. For example, in some embodiments, the node 600 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 602 of node 600 may be configured to control such a communications interface to transmit to and/or receive from other nodes or network functions requests, resources, information, data, signals, or similar.

Briefly, in one embodiment, the node 600 may be configured to obtain measurements of conditions on a plurality of carrier frequencies, and determine a first model based on the obtained measurements that takes as input the conditions on a first subset of the plurality of carrier frequencies and outputs a prediction of the conditions on a second subset of the plurality of carrier frequencies, based on the conditions of the first subset of carrier frequencies.

Obtaining measurements of conditions on a plurality of carrier frequencies and determining a first model based on the obtained measurements were described in detail with respect to the method 300 in blocks 302 and 304 above and the detail therein will be appreciated to apply equally to embodiments of the node 600.

In another embodiment, the node 600 may be configured to determine a first subset of a plurality of carrier frequencies, the first subset of carrier frequencies being for use in predicting conditions on a second subset of the plurality of carrier frequencies, provide conditions on the first subset of the plurality of carrier frequencies to a first model, and receive from the first model a prediction of the conditions on the second subset of the plurality of carrier frequencies.

Determining a first subset of a plurality of carrier frequencies, providing conditions on the first subset of the plurality of carrier frequencies to a first model and receiving from the first model a prediction of the conditions on the second subset of the plurality of carrier frequencies were all described above with respect to blocks 502, 504 and 506 of the method 500 and the detail therein will be appreciated to apply equally to embodiments of the node 600.

Figure 7:
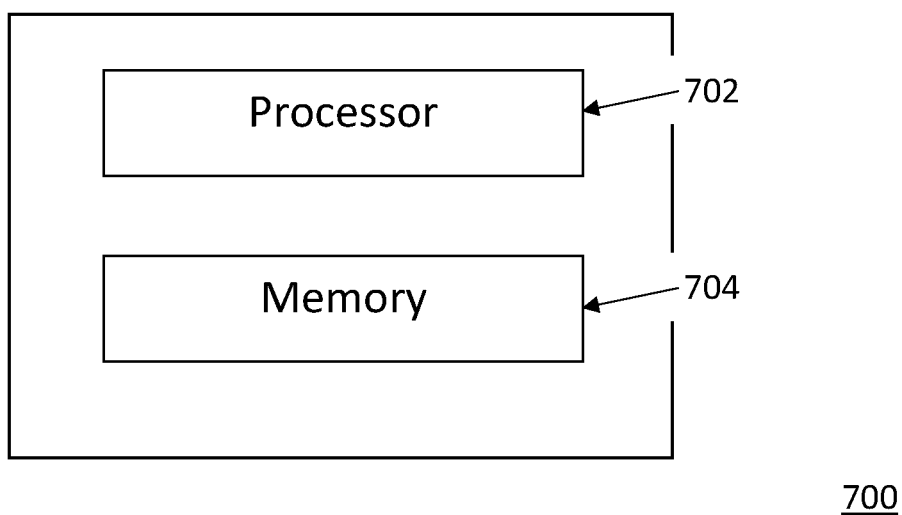
FIG. 7 illustrates a user equipment according to some embodiments herein.

Turning now to FIG. 7, in some embodiments there is a user equipment 700, comprising a processor 702 and a memory 704. In some embodiments, the memory 704 contains instructions executable by the processor 702, and the set of instructions, when executed by the processor, cause the processor to: obtain measurements of conditions on a plurality of carrier frequencies, and determine a first model based on the obtained measurements that takes as input the conditions on a first subset of the plurality of carrier frequencies and outputs a prediction of the conditions on a second subset of the plurality of carrier frequencies, based on the conditions of the first subset of carrier frequencies.

Obtaining measurements of conditions on a plurality of carrier frequencies and determining a first model based on the obtained measurements were described in detail with respect to the method 300 in blocks 302 and 304 above and the detail therein will be appreciated to apply equally to embodiments of the user equipment 700.

In some embodiments (additionally or alternatively), the set of instructions, when executed by the processor, cause the processor to: determine a first subset of a plurality of carrier frequencies, the first subset of carrier frequencies being for use in predicting conditions on a second subset of the plurality of carrier frequencies, provide conditions on the first subset of the plurality of carrier frequencies to a first model, and receive from the first model a prediction of the conditions on the second subset of the plurality of carrier frequencies.

Determining a first subset of a plurality of carrier frequencies, providing conditions on the first subset of the plurality of carrier frequencies to a first model and receiving from the first model a prediction of the conditions on the second subset of the plurality of carrier frequencies were all described above with respect to blocks 502, 504 and 506 of the method 500 and the detail therein will be appreciated to apply equally to embodiments of the user equipment 700.

In more detail, the UE 700 may comprise a device capable, configured, arranged and/or operable to communicate wirelessly with network nodes and/or other wireless devices. Unless otherwise noted, the term UE may be used interchangeably herein with wireless device (WD). Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE 700 include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE 700 as described above may represent the endpoint of a wireless connection, in which case the device may be referred to as a wireless terminal. Furthermore, a UE as described above may be mobile, in which case it may also be referred to as a mobile device or a mobile terminal.

The UE 700 may be configured or operative to perform the methods and functions described herein, such as the methods 300, 400 or 500 as described above. The UE 700 may comprise processor (or logic) 702. It will be appreciated that the UE 700 may comprise one or more virtual machines running different software and/or processes. The UE 700 may therefore comprise one or more servers, switches and/or storage devices and/or may comprise cloud computing infrastructure or infrastructure configured to perform in a distributed manner, that runs the software and/or processes.

The processor 702 may control the operation of the UE 700 in the manner described herein. The processor 702 can comprise one or more processors, processing units, multi-core processors or modules that are configured or programmed to control the UE 700 in the manner described herein. In particular implementations, the processor 702 can comprise a plurality of software and/or hardware modules that are each configured to perform, or are for performing, individual or multiple steps of the functionality of the UE 700 as described herein.

The UE 700 may comprise a memory 704. In some embodiments, the memory 704 of the UE 700 can be configured to store program code or instructions that can be executed by the processor 702 of the UE 700 to perform the functionality described herein. Alternatively or in addition, the memory 704 of the UE 700, can be configured to store any requests, resources, information, data, signals, or similar that are described herein. The processor 702 of the UE 700 may be configured to control the memory 704 of the UE 700 to store any requests, resources, information, data, signals, or similar that are described herein.

It will be appreciated that the UE 700 may comprise other components in addition or alternatively to those indicated in FIG. 7. For example, the UE 700 may comprise a communications interface. The communications interface may be for use in communicating with other UEs and/or nodes in the communications network, (e.g. such as other physical or virtual nodes such as the node 600 described above). For example, the communications interface may be configured to transmit to and/or receive from nodes or network functions requests, resources, information, data, signals, or similar. The processor 702 of UE 700 may be configured to control such a communications interface to transmit to and/or receive from nodes or network functions requests, resources, information, data, signals, or similar.

Turning now to other embodiments, there is a computer program product comprising a computer readable medium, the computer readable medium having computer readable code embodied therein, the computer readable code being configured such that, on execution by a suitable computer or processor, the computer or processor is caused to perform the any of the embodiments of the methods 300, 400 or 500 as described above.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together

The invention claimed is:

1. A method performed by a node in a communications network for determining a first model for use in predicting conditions on carrier frequencies in the communications network, the method comprising:
   obtaining measurements of conditions on a plurality of carrier frequencies; and
   determining a first model based on the obtained measurements that:
      takes as input the conditions on a first subset of the plurality of carrier frequencies; and
      outputs a prediction of the conditions on a second subset of the plurality of carrier frequencies, based on the conditions of the first subset of carrier frequencies;
   sending details of the first model to a user equipment such that the user equipment may create a local version of the first model on the user equipment and train the local model, based on measurements of conditions on the plurality of carrier frequencies as measured by the user equipment;
   receiving from the user equipment an indication of an outcome of the training of the local model performed by the user equipment; and
   updating the first model based on the received outcome.

2. The method of claim 1, wherein the determining the first model comprises training a machine learning model to predict the conditions on the second subset of the plurality of carrier frequencies based on the conditions on the first subset of the plurality of carrier frequencies using the obtained measurements as training data.

3. The method claim 1, wherein a number of carrier frequencies in the first subset of the plurality of carrier frequencies comprises a maximum number of frequencies on which measurements may be reported in idle mode by a user equipment.

4. The method of claim 3:
   wherein the second subset of the plurality of carrier frequencies comprises frequencies available to the UE for a load balancing, carrier aggregation (CA) orchestration operation, or dual connectivity (DC) orchestration operation;
   wherein the first model may be used to predict, from measurements made on the maximum number of frequencies on which measurements may be reported in idle mode by a user equipment, the conditions on the frequencies available to the UE for the load balancing, CA orchestration operation, or DC orchestration operation.

5. The method of claim 3:
   wherein the second subset of the plurality of carrier frequencies comprises all carrier frequencies available to the user equipment; and
   wherein the first model may be used to predict, from measurements made on the maximum number of frequencies on which measurements may be reported in idle mode by a user equipment, the conditions on all of the other carrier frequencies available to the user equipment.

6. The method of claim 1, wherein the method comprises determining an accuracy of the predicted conditions on each of the second subset of the plurality of carrier frequencies.

7. The method of claim 6, wherein the method comprises determining a validity period for the predicted conditions on each of the second subset of the plurality of carrier frequencies.

8. The method of claim 1:
   wherein the method comprises determining a second model;
   wherein the second model:
      takes as input an indication of each of the frequencies in the second subset of the plurality of carrier frequencies; and
      outputs a measurement configuration indicating an IDLE mode measurement configuration for a user equipment (UE) that may be used to collect measurements that may be provided as input to the first model.

9. The method of claim 8, wherein the second model further takes as input:
   an accuracy requirement for a prediction made by the first model;
   an indication of a load on one or more carrier frequencies; and/or
   geographical information related to a UE.

10. A method in a communications network for determining conditions on carrier frequencies in the communications network, the method comprising:
    determining a first subset of a plurality of carrier frequencies, the first subset of carrier frequencies being for use in predicting conditions on a second subset of the plurality of carrier frequencies, determining the first subset of the plurality of carrier frequencies comprising determining carrier frequencies for which a first model is determined to be valid for more than a threshold time interval;
    providing conditions on the first subset of the plurality of carrier frequencies to the first model; and
    receiving, from the first model, a prediction of the conditions on the second subset of the plurality of carrier frequencies.

11. The method of claim 10, wherein the determining a first subset of the plurality of carrier frequencies comprises:
    providing an indication of the carrier frequencies in the second subset of the plurality of carrier frequencies to a second machine learning model as input; and
    receiving, from the second machine learning model, a measurement configuration indicating an IDLE mode measurement configuration for a user equipment (UE) that may be used to collect measurements that may be provided as input to the first model in order for the first machine learning model to predict the conditions on the second subset of the plurality of carrier frequencies.

12. The method of claim 10, wherein the determining the first subset of the plurality of carrier frequencies comprises determining the first subset of carrier frequencies based on an accuracy of the first model at predicting the conditions on the second subset of the plurality of carrier frequencies from the conditions on the first subset of the plurality of carrier frequencies.

13. The method of claim 10, wherein carrier frequencies comprised in the second subset of carrier frequencies comprise carrier frequencies on which the resource load is below a threshold.

14. The method of claim 10, wherein a number of carrier frequencies in the first subset of carrier frequencies comprises a maximum number of frequencies on which measurements may be reported in idle mode by a user equipment.

15. The method of claim 10, wherein the method is performed by a network node and the method comprises:
   sending an indication of the determined first subset of carrier frequencies to a user equipment; and
   receiving measurements of conditions on the first subset of carrier frequencies from the user equipment; and
   wherein providing conditions on the first subset of the plurality of carrier frequencies to a first model comprises providing the measurements of conditions on the first subset of carrier frequencies from the user equipment to the first model.

16. The method of claim 15, wherein the method comprises sending the prediction of the conditions on the second subset of the plurality of carrier frequencies from the first model to the user equipment for use by the user equipment to determine a carrier frequency to connect to.

17. The method of claim 15, wherein the method comprises determining a carrier frequency for the user equipment to connect to, based on the prediction of the conditions on the second subset of the plurality of carrier frequencies from the first model.

18. The method of claim 10, wherein the method is performed by a user equipment and the method comprises:
   receiving an indication of one or more parameters from a node in the communications network; and
   using the one or more parameters to determine the first model.

\* \* \* \* \*